United States Patent [19]

Beckey

[11] Patent Number: 4,598,764
[45] Date of Patent: Jul. 8, 1986

[54] REFRIGERATION HEAT PUMP AND AUXILIARY HEATING APPARATUS CONTROL SYSTEM WITH SWITCHOVER DURING LOW OUTDOOR TEMPERATURE

[75] Inventor: Thomas J. Beckey, Edina, Minn.
[73] Assignee: Honeywell Inc., Minneapolis, Minn.
[21] Appl. No.: 658,855
[22] Filed: Oct. 9, 1984
[51] Int. Cl.[4] ............................................. F25B 29/00
[52] U.S. Cl. ...................................... 165/29; 62/202; 236/68 B
[58] Field of Search .................... 165/29; 62/160, 202; 236/68 R, 68 B, 68 C

[56] References Cited

U.S. PATENT DOCUMENTS

| | | | |
|---|---|---|---|
| 2,295,340 | 9/1942 | Fiene | 236/68 |
| 2,382,073 | 8/1945 | Lehane et al. | 62/202 X |
| 3,093,977 | 6/1963 | Liebrecht | 62/208 |
| 3,113,439 | 12/1963 | Eargle | 62/202 X |
| 3,373,800 | 3/1968 | Ferdelman | 165/29 |
| 3,784,094 | 1/1974 | Goodwin | 236/68 C |
| 4,046,531 | 9/1977 | Nelson et al. | 62/202 |
| 4,102,390 | 7/1978 | Harnish et al. | 165/29 |
| 4,228,846 | 10/1980 | Smorol | 165/2 |
| 4,265,299 | 5/1981 | Harnish | 165/12 |
| 4,270,597 | 6/1981 | Denny | 165/27 |
| 4,289,272 | 9/1981 | Murase et al. | 62/160 X |
| 4,298,056 | 11/1981 | Nelson | 165/12 |
| 4,311,190 | 1/1982 | Walley | 165/25 |
| 4,316,577 | 2/1982 | Adams et al. | 236/46 R |
| 4,346,755 | 8/1982 | Alley et al. | 62/160 X |
| 4,404,815 | 9/1983 | Gilson | 62/180 |
| 4,489,882 | 12/1984 | Rogers | 236/68 B X |

Primary Examiner—Albert W. Davis, Jr.
Assistant Examiner—Randolph A. Smith
Attorney, Agent, or Firm—Clyde C. Blinn

[57] ABSTRACT

A control system for a refrigeration heat pump apparatus and an auxiliary heating apparatus has a two stage thermostat with the first stage normally controlling the heat pump apparatus and the second stage normally controlling the auxiliary heating apparatus. An outdoor temperature thermostat is used to transfer the control of the auxiliary heating apparatus to the first stage when the outdoor temperature drops below a predetermined value and the heat pump is deenergized as its efficiency drops at that low outdoor temperature. Each of the stages of the thermostat has an anticipation means such as a heater to artificially heat the temperature responsive element. In order to improve the control and reduce the large change in temperature when the auxiliary heat is switched over to the first stage, both of the anticipation heaters of the first and second stage are connected to be controlled by the first stage during the operation of auxiliary heat by the first stage.

5 Claims, 3 Drawing Figures

REFRIGERATION HEAT PUMP AND AUXILIARY HEATING APPARATUS CONTROL SYSTEM WITH SWITCHOVER DURING LOW OUTDOOR TEMPERATURE

BACKGROUND AND SUMMARY OF THE INVENTION

When refrigeration heat pump compressor apparatus is used to supply heat to a space such as a home, many heat pump manufacturers require that the heat pump compressor be turned off at certain low outdoor temperatures. To heat the space during these times only, a more expensive auxiliary heat apparatus such as electric strip heaters is used to maintain the temperature control in the space. The control of the heat pump apparatus and the auxiliary heat is generally accomplished by a thermostat with at least two stages. The first stage is used to control the heat pump apparatus and the second stage is used to control the auxiliary heat apparatus. A differential temperature exists between the two stages of control. In a forced air heating system, the fan for delivering conditioned air to the space is often turned on and off with the first stage during the control of the heat pump apparatus. An outdoor thermostat is used to prevent the operation of the heat pump compressor below some outdoor temperature, and at that predetermined outdoor temperature, the first stage control of the thermostat is transferred to the control of the auxiliary heating apparatus and the heat pump is rendered inactive.

The control temperature of the first stage ranges from 0 to 100% load along a characteristic curve known as the first stage temperature droop curve. The second stage of the thermostat has a temperature droop curve throughout the 0 to 100% load of the second stage; however, the curves are offset by the temperature differential between the stages. When the control of the auxiliary heat is switched from the second stage to the first stage, a substantial change in the control temperature takes place which is often unacceptable to the home owner.

The present invention is concerned with the control of the heat anticipation to the thermostat. While each stage has an anticipation means, when the control of the auxiliary heating apparatus is switched to the first stage, the anticipation means for each of the stages is energized by the first stage. With the additional anticipation, the temperature droop curve for the first stage has a greater droop and the control point of the first stage is not greatly different than the control point of the second stage to overcome the objection of a drastic change in the control point when the switchover occurs.

DESCRIPTION OF THE INVENTION

Figure 1:
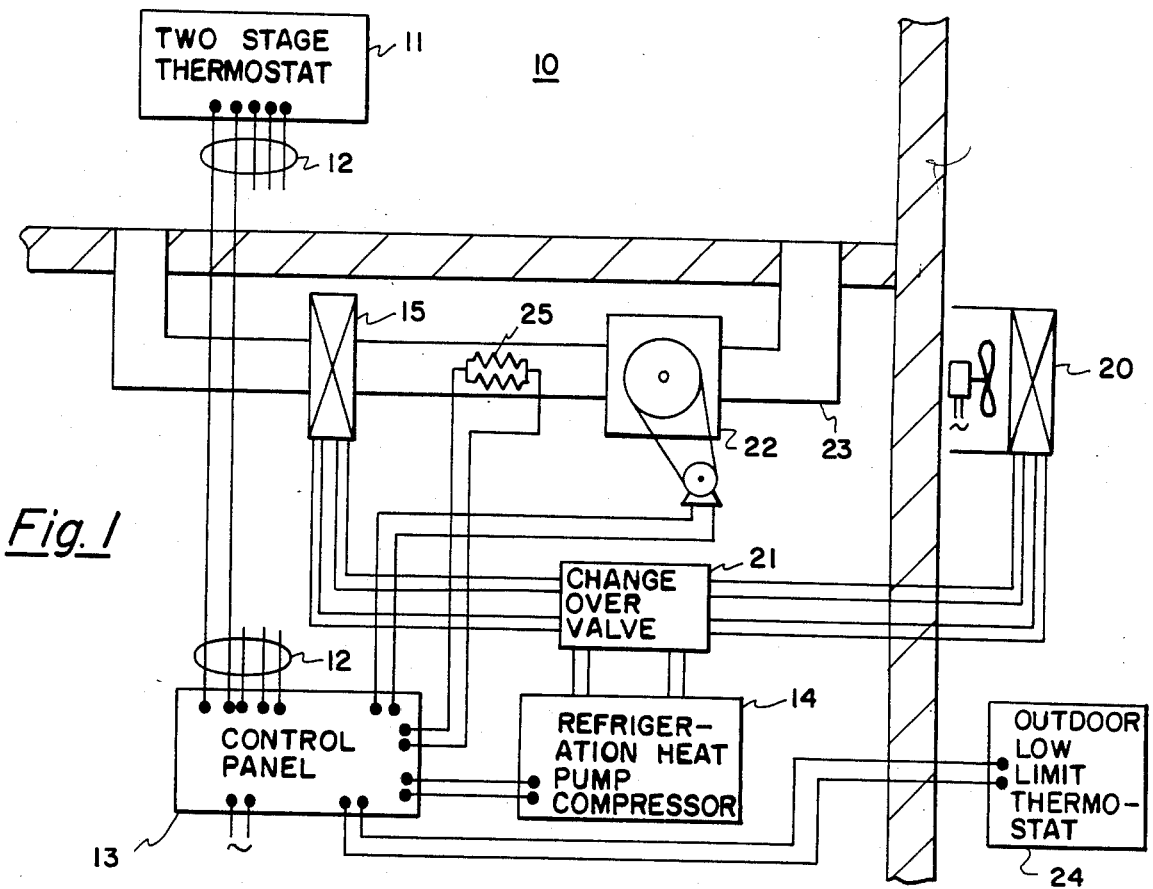
FIG. 1 is a schematic representation of the control system.

Referring to FIG. 1, the temperature in a space 10 which might be a building or a home is controlled by a conventional multistage temperature responsive means or thermostat 11. Such thermostats are broadly old and, as in the T874 Multistage Thermostat manufactured by applicant's assignee, two separate bimetals are used to control mercury switches to provide two stages of operation with a set temperature for each stage and a differential between the stages. The thermostat 11 is connected by a wiring harness 12 to a control panel 13 adapted to control a refrigeration heat pump compressor apparatus 14 connected to heat exchangers 15 and 20 through a changeover valve 21 for selectively providing heating or cooling of the air delivered by a fan 22 through a duct 23 to space 10. During a heating operation, the heat pump or refrigeration apparatus removes heat from the outdoor air by exchanger 20 and transfers the heat to the air passing through exchanger 15, such as shown in U.S. Pat. No. 3,093,977, issued June 18, 1963, to W. W. Liebrecht, and/or U.S. Pat. No. 4,298,056, issued Nov. 3, 1981, to L. W. Nelson.

An outdoor temperature responsive means or thermostat 24 is connected to control panel 13 to deenergize the refrigeration compressor and make use of auxiliary heating apparatus 25 such as electric strip heaters or a gas furnace when the outdoor temperature is below some predetermined temperature.

Figure 2:
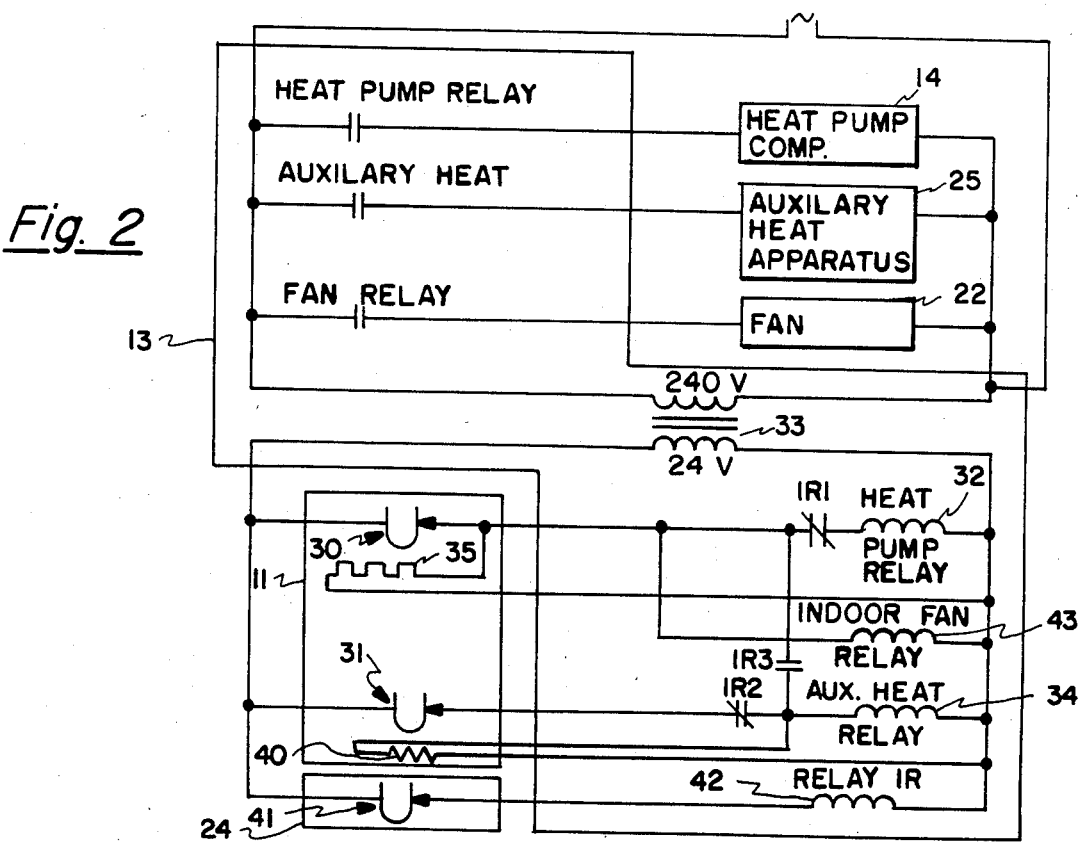
FIG. 2 is a schematic drawing of the circuit of the control panel.

Referring to FIG. 2, thermostat 11 has a first stage or bimetal operated switch 30 and a second stage or bimetal operated switch 31. Stage 1 or switch 30 is connected to control the operation of a heat pump or compressor relay 32 which has a switch adapted to control heat pump compressor 14 and is connected to a source of power 33. The second stage, or switch 31, is connected to an auxiliary heat relay 34 which has a switch adapted to control auxiliary heat apparatus 25. Each of the stages has its anticipation means or heaters 35 and 40 which artificially heat the thermostat when the switch contacts are closed causing a droop in the temperature control point for stability. Such anticipation is broadly disclosed in U.S. Pat. No. 2,295,340, issued Sept. 8, 1942, to M. E. Fiene, and may be electronic such as disclosed in the John T. Adams, et al, U.S. Pat. No. 4,316,577, issued Feb. 23, 1982.

The outdoor temperature responsive means or thermostat 24 has a temperature responsive switch 41 which closes below a predetermined outdoor temperature to energize relay 1R or the switchover relay 42 which controls switches 1R1, 1R2 and 1R3. Switch 1R1 disconnects the heat pump relay to render the refrigeration heat pump compressor inactive. Switch 1R2 disconnects the second stage, or thermostat 31, from the auxiliary heat relay 34, and switch 1R3 connects the auxiliary heat relay to the first stage, or thermostat 30.

Simultaneously with the transfer of the control of auxiliary heat relay 34 to first stage thermostat 30, the anticipation heater 40 is connected to the first stage so that, upon closing of the first stage thermostat 30, both heaters 35 and 40 are energized and the combined anticipation of the thermostat 11 is activated by the first stage, or switch 30.

OPERATION OF THE INVENTION

Normally, upon a call for heat by thermostat 11, the first stage or switch 30 as shown in FIG. 2 closes to energize the heat pump relay to bring about the operation of the refrigeration heat pump compressor 14. Simultaneously, the indoor fan relay 43 is energized to bring about the energization of fan 22. If the space temperature continues to drop, the second stage, or switch 31, closes to bring about the energization of the auxiliary heat relay 34, and thus auxiliary heat 25.

Should the outdoor temperature drop below some predetermined value such as zero degrees Fahrenheit, switch 41 closes and relay 42 is energized to render the heat pump relay 32 inoperative and connect the auxiliary heat relay to the first stage or switch 30. Upon further call for heat by the first stage, the auxiliary heat and the fan relay 43 are operated together.

Figure 3:
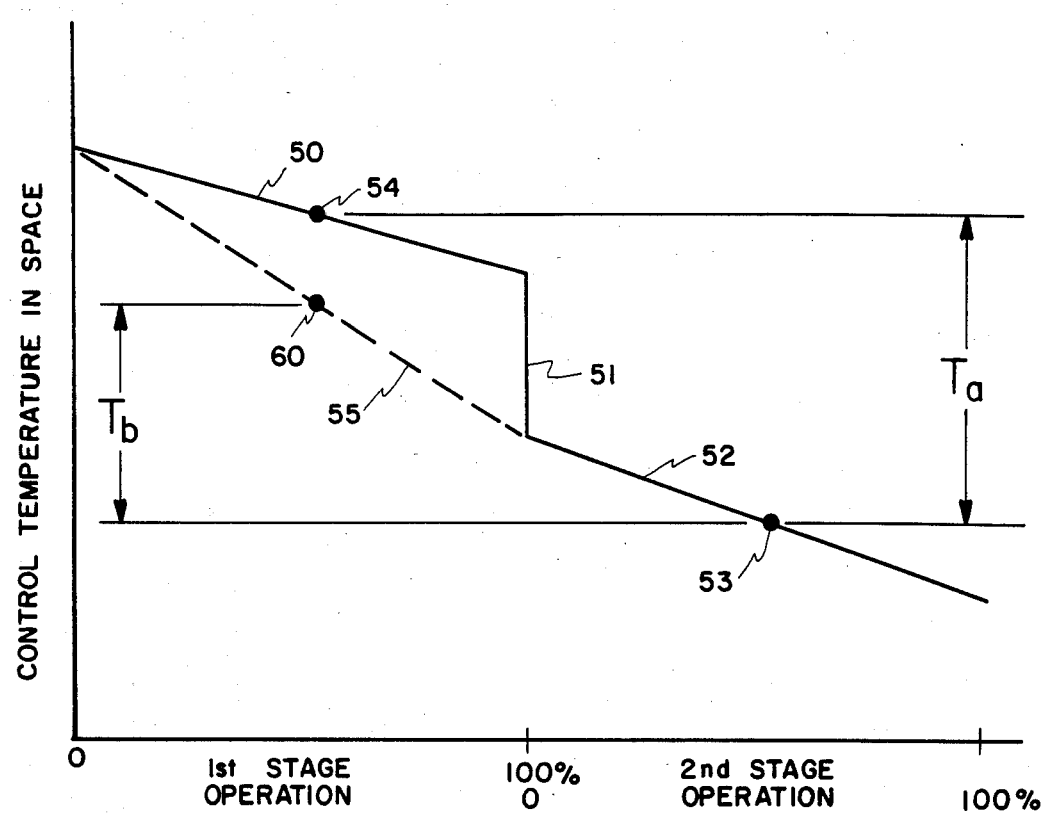
FIG. 3 is a graphical representation of the operation of the first and second stages of the thermostat.

Referring to FIG. 3, the control temperature in the space for the first stage operation load and the second stage operation load is shown graphically. Curve 50 is the control temperature droop curve for stage 1, or switch 30, throughout the first stage operation from 0 to 100% load. After passing through the inner stage differential 51, curve 52 is the control temperature droop curve for the second stage, or switch 31. Let us assume that thermostat 11 is operating with the first stage closed and the second stage switch 31 cycling at 50% load to be operating at a control temperature as shown at 53. Upon a switchover of the auxiliary heat to the first stage, the control temperature would normally change to the temperature shown at 54 and with this large change in temperature $T_a$, the home owner would experience this change and be uncomfortable.

By the use of the switch 1R3 to connect the heat anticipation heater and thus the full heat anticipation apparatus for the thermostat to be controlled by the first stage, the temperature droop curve for stage 1 is changed to that shown at 55 and the temperature $T_b$ maintained is shown at 60, to reduce the amount of temperature change and thus add to the comfort of the control system.

While the anticipation means is shown as heaters 35 and 40, other types of anticipation, such as electronic anticipation of the Adams patent, might be used for a thermostat and the degree of electronic anticipation would be changed to reduce the offset or change in controlled temperature from that of $T_a$ to $T_b$ for a more comfortable situation.

The embodiments of the invention in which an exclusive property or right is claimed are defined as follows:

1. An improvement in a control system having a multistage space thermostat with a first stage adapted to control a refrigeration heat pump apparatus and with a second stage adapted to control an auxiliary heating apparatus and having an outdoor temperature responsive means responsive to outdoor temperature for disconnecting the heat pump from the first stage to render the heat pump inoperative and connecting the auxiliary heat to be controlled by the first stage when the outdoor temperature is below a predetermined value, the improvement comprising anticipation means for each of said first and second stages of said space thermostat, and
   means connected to the outdoor temperature responsive means to connect said anticipation means of each of said stages to be controlled by said first stage at a predetermined outdoor temperature when said auxiliary heating apparatus is controlled by said first stage to reduce the abrupt change in controlled space temperature by the transfer of the control of auxiliary heat from said second stage to said first stage.

2. The invention of claim 1 wherein
   said first stage is a first temperature responsive switch means and said anticipation means is a first heater for artificially heating said temperature responsive switch means when said temperature responsive switch means is calling for operation of the heat pump apparatus, and
   said second stage is a second temperature responsive switch means and said anticipation means is a second heater for artificially heating said second temperature responsive switch means when said second temperature responsive means is calling for operation of said auxiliary heating apparatus.

3. The invention of claim 2 wherein
   said first temperature responsive switch means is a bimetal element to which a mercury switch is attached, and
   said second temperature responsive switch means is a bimetal element to which a mercury switch is attached.

4. A control system for controlling a refrigeration heat pump apparatus and an auxiliary heating apparatus for reducing the change in controlled space temperature when the system switches from control by refrigeration heat pump appratus and auxiliary heating apparatus to control by auxiliary heating apparatus alone, comprising, space temperature responsive means having a first temperature responsive means for controlling in a first range of temperatures, a second temperature responsive means for controlling in a second range of temperatures, said first and second ranges of temperature are separated by a temperature differential, first anticipation circuit means operated by said first temperature responsive means and second anticipation circuit means operated by said second temperature responsive means,
   control apparatus comprising first relay means adapted to control the operation of the heat pump apparatus and second relay means adapted to control the operation of the auxiliary heating apparatus,
   outdoor temperature responsive means,
   changeover relay means connected to be energized when said outdoor responsive means responds to a temperature below a predetermined temperature,
   circuit means including said changeover relay means when the heat pump apparatus is to operate for connecting said first temperature responsive means to said first relay means,
   second circuit means including said changeover relay means when the heat pump apparatus is to operate for connecting said second temperature responsive means to said second relay means,
   third circuit means including said changeover relay means when operated at a predetermined outdoor temperature connecting said second relay means to said first temperature responsive means, deactivating said heat pump and disconnecting said second relay means from said second temperature responsive means, and
   means including said changeover relay means for connecting said first and second anticipation circuit means to be controlled by said first temperature responsive means to reduce the amount of change in controlled space temperature when operation is transferred from said second range to said first range.

5. The invention of claim 4 wherein
   said first anticipation circuit means is a first electric heater for artificially heating said first temperature responsive means when said first means is activated to energize the heat pump apparatus,
   said second anticipation circuit means is a second electric heater for artificially heating said second temperature responsive switch means when said switch means is closed to energize said auxiliary heating apparatus.

* * * * *